Feb. 28, 1967  N. E. WELLS  3,306,017
APPARATUS FOR TOPPING SUGAR BEETS AND SAVING THE SEVERED TOPS
Filed June 26, 1964  4 Sheets-Sheet 1
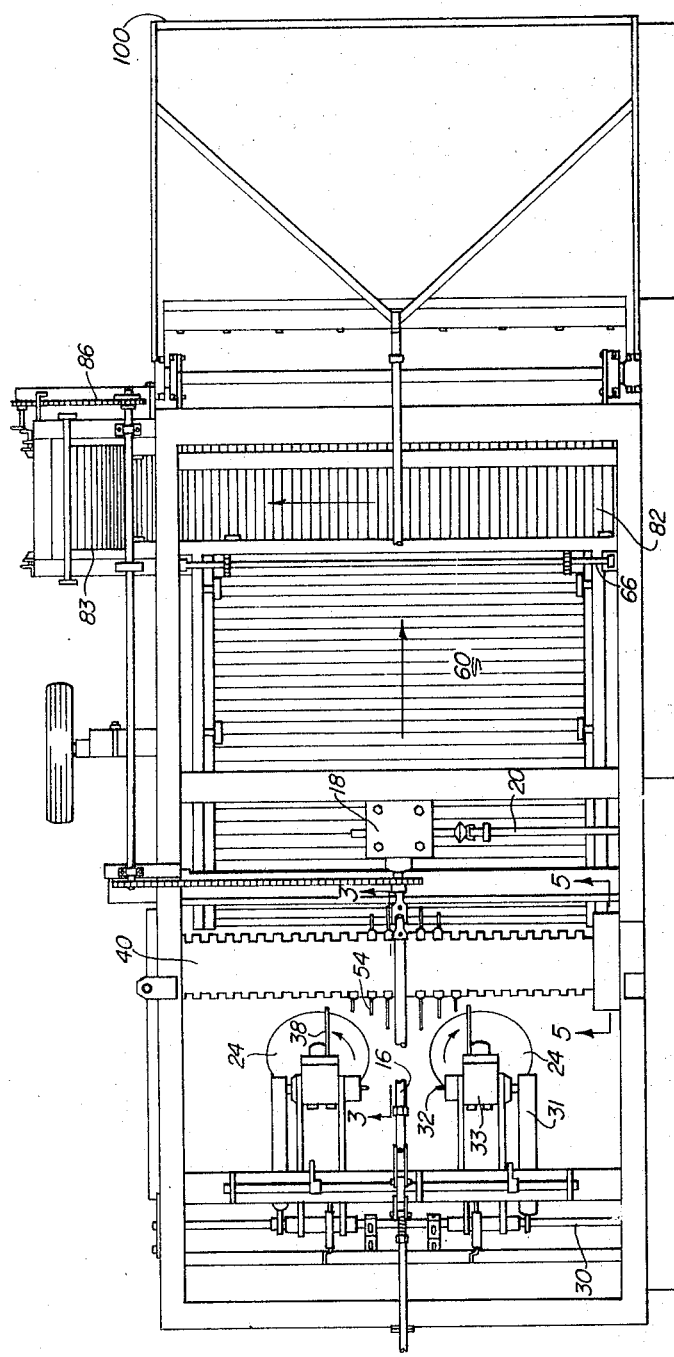
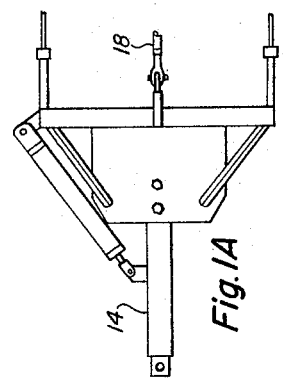
NOVELL E. WELLS
INVENTOR.
BY
BUCKHORN, BLORE, KLARQUIST & SPARKMAN
ATTORNEYS Feb. 28, 1967        N. E. WELLS        3,306,017
APPARATUS FOR TOPPING SUGAR BEETS AND SAVING THE SEVERED TOPS
Filed June 26, 1964        4 Sheets-Sheet 2
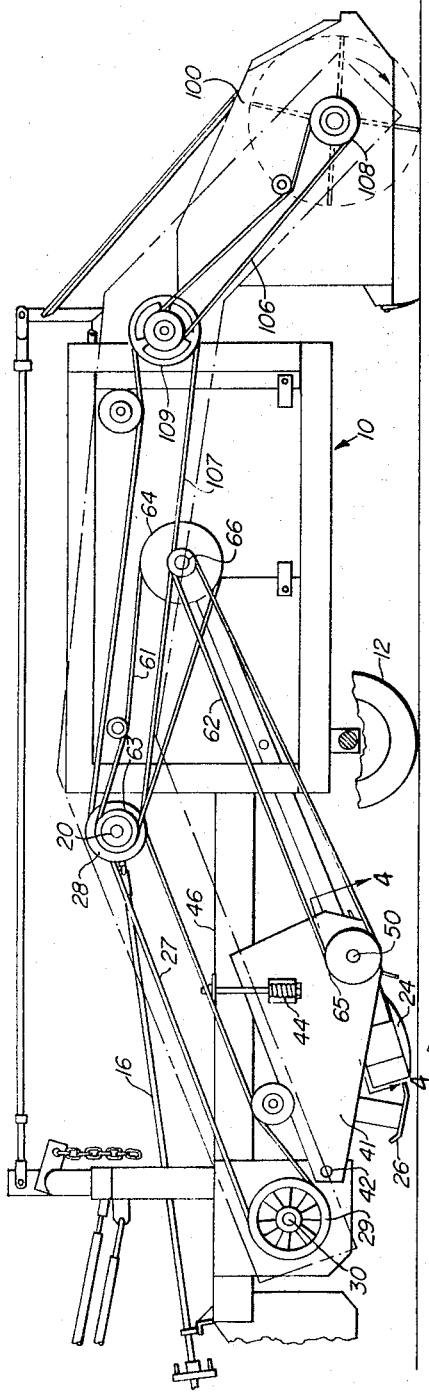
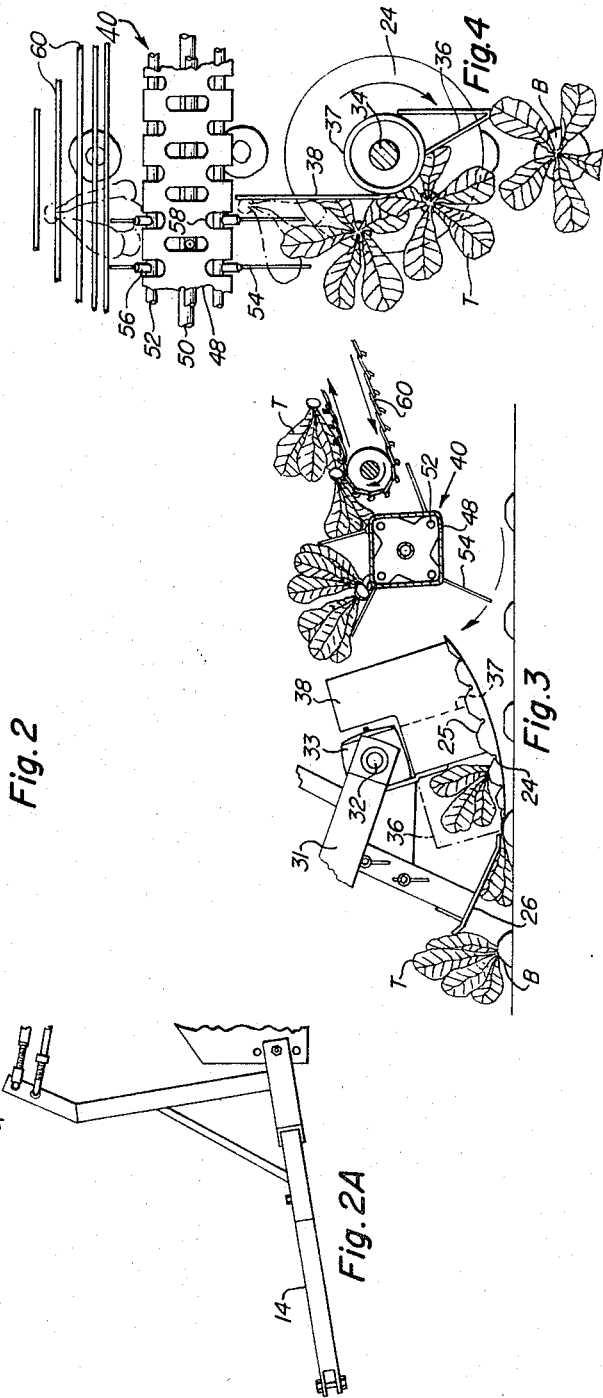
NOVELL E. WELLS
INVENTOR.
BY
BUCKHORN, BLORE, KLARQUIST & SPARKMAN
ATTORNEYS Feb. 28, 1967   N. E. WELLS   3,306,017
APPARATUS FOR TOPPING SUGAR BEETS AND SAVING THE SEVERED TOPS
Filed June 26, 1964   4 Sheets-Sheet 3

NOVELL E. WELLS
INVENTOR.
BY
BUCKHORN, BLORE, KLARQUIST & SPARKMAN
ATTORNEYS 3,306,017
APPARATUS FOR TOPPING SUGAR BEETS AND
SAVING THE SEVERED TOPS
Novell E. Wells, 927 Ranch Road, Boise, Idaho 83702
Filed June 26, 1964, Ser. No. 378,342
13 Claims. (Cl. 56—121.45)

The present invention relates to apparatus for topping sugar beets and saving and conditioning the severed tops for use as feed for livestock.

Some prior topping machines have included devices for windrowing the severed tops between the rows of beets to be harvested. Such prior machines, however, treat the severed tops roughly, often shredding the foliage and separating the foliage from the crown so that the tops dry out quickly, making them unsuitable for livestock consumption. Often, too, prior toppers sometimes remove such a large portion of the beet itself that livestock are unable to handle the resulting large pieces.

A primary object of the present invention, therefore, is to provide a new and improved apparatus for topping sugar beets and saving the severed tops for use as livestock feed.

Another object of the invention is to provide a beet topper and top saver that keeps the crown and leaf of the severed tops intact while loading or windrowing the severed tops.

A further object is to provide a new and improved beet top-saving apparatus that breaks the severed crowns of the beet tops into pieces of a size suitable for use as livestock feed, without any substantial tearing of the attached foliage.

Another object is to provide beet top-having apparatus which also cleans any remaining growth or debris from the topped beets in the field in preparation for the harvesting thereof.

Another object is to provide a beet topper and top saver capable of delivering the severed tops either onto a vehicle for storage or into windrows as desired.

A further object is to provide a beet topper and top-saving apparatus capable of topping, saving the tops and cleaning the topped beets in two or more rows simultaneously.

In furtherance of the above objects and in accordance with an illustrated embodiment, the present apparatus includes a pair of rotatable cutter discs arranged on a mobile frame so that the discs top two rows of beets simultaneously. The cutter discs are rotated by suitable drive means in a direction to carry the severed tops inwardly and rearwardly between the two rows being topped, on the upper surface of the cutters. Deflector plates extending across the upper surface of each disc prevent the severed tops from being carried laterally to the outside of the two rows. Just to the rear of the discs an elongate rotating drum extends from side to side of the frame and has several rows of pickup fingers projecting outwardly therefrom. The fingers pass closely adjacent the discs as the drum rotates, and lift the tops carried rearwardly by the discs, over the drum and onto an elevating conveyor, which continues to carry the tops rearwardly on the frame to a cross conveyor. The cross conveyor transfers the beet tops laterally to one side of the frame and in between a pair of crushing rolls, which coact to crush the beet crowns into bite-size pieces suitable for livestock feed. The crushing rolls deliver the crushed tops either into another elevating conveyor which transports the tops onto a vehicle moving alongside the apparatus for storage, or, alternatively, onto another conveyor projecting laterally from the frame, which discharges the tops onto a windrow extending alongside the frame. At the same time that the two rows of beets are topped and the tops conditioned as aforesaid, any remaining debris is swept from the upper surfaces of the topped beets in the same two rows by rotating sets of flexible, rubber-like flails.

The above and other objects and advantages of the present apparatus will become more apparent in the following description and the accompanying drawings wherein:

FIG. 1 is a schematic top plan view showing apparatus in accordance with the present invention;

FIG. 1-A is a continuation of FIG. 1 showing the front end portion of the apparatus;

FIG. 2 is a schematic side elevational view showing the apparatus of FIG. 1;

FIG. 2-A is a continuation of FIG. 2 showing the front end portion of the apparatus;

FIG. 3 is an enlarged side elevational view showing schematically a portion of the topping, pickup and conveying mechanism, taken approximately along the line 3—3 of FIG. 1;

FIG. 4 is a fragmentary top plan view of the same elements as shown in FIG. 3 taken approximately along the line 4—4 of FIG. 2;

Figure 6:
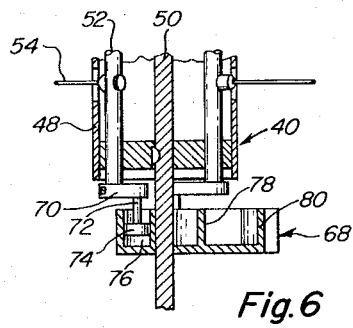
FIG. 6 is a sectional view taken along the line 6—6 of FIG. 5.

With reference to the drawings, FIGS. 1 and 2 illustrate one form of beet topping apparatus in accordance with the invention, including a mobile frame 10 elongate in the direction of travel and supported on a pair of wheels 12 positioned for travel between rows of beets to be harvested. The illustrated frame has a width sufficient to span at least two adjacent rows of beets. The front end of the frame includes a tongue 14 for connection to a tractor (not shown) and a power take-off shaft 16 adapted at one end for connection to the power take-off unit of the tractor. The opposite end of the power take-off shaft terminates within a gear box 18 from which a lateral drive shaft 20 extends to one side of the frame for driving through suitable belts, pulleys, chains and sprockets the various components of the unit.

The illustrated unit is intended for topping two adjacent rows of beets simultaneously, and for this purpose a pair of cutter discs 24 having beet-cutting edges 25 are mounted in side-by-side, laterally spaced-apart relationship on the frame directly over two adjacent rows of beets B to be topped. The discs are mounted independently of one another for vertical adjustment, and each disc has an appurtenant depth gauge, or shoe, 26 which determines the depth of cut and acts to vary the height of the disc 24 so that each beet will be topped at approximately the same depth regardless of the unevenness of the terrain.

The specific means for mounting, adjusting and driving each cutter disc and shoe is illustrated and described in detail in co-pending application Serial No. 345,324, filed February 17, 1964, now Patent No. 3,257,787, issued June 28, 1966, for Beet Harvester with Deflector Means.

Briefly, each disc is rotated by a drive means which includes an endless belt 27 and pulleys 28, 29 driven from the lateral drive shaft 20, which belt and pulleys in turn rotate a front drive shaft 30 (FIG. 1). A pair of drive chains (not shown) extend rearwardly within chain guards 31 (FIGS. 1 and 3) from sprockets on the shaft 30 to other sprockets on cross shafts 32, which extend through gear boxes 33, there being a separate drive chain, cross shaft and gear box for each disc. Within each gear box a set of bevel gears drives an inclined drive shaft 34 (FIG. 4) connected at its lower end to one of the discs 24.

A shown most clearly by the directional arrows in FIGS. 1 and 4, the two cutter discs are rotated in opposite directions so that the rotative motion of the discs carries the severed tops T laterally inwardly between the pair of discs and rearwardly with respect to the direction of travel of the frame, on the top surfaces of the discs. Each cutter disc has an appurtenant deflector plate 36 projecting forwardly and outwardly across the upper surface of the disc from a cylindrical casing 37 surrounding the drive shaft 34, for deflecting the severed beet tops inwardly between the two discs. Another deflector plate 38 projects straight rearwardly across the upper surface of each disc from its casing 37 and prevents the tops from being carried laterally outwardly from between the discs. The casing 37 prevents the severed tops from becoming entangled about the drive shaft 34.

A pickup means is mounted rearwardly adjacent the cutter discs for transferring the tops from the discs rearwardly on the frame to a conveying means. The pickup means includes an elongate drum 40 extending laterally from side to side of the frame 10 and rotatably mounted between a pair of support arms 41, one of which is shown in FIG. 2. The forward end of each support arm is pivotally attached at 42 to a front end portion of the frame, while a midportion of each arm is suspended by a spring and rod assembly 44 to a rigid side member 46 of the frame. This mounting gives the arms a spring flotation effect so that the drum 40 is self-adjusting vertically for variations in terrain.

Referring to FIGS. 3 and 4, each drum 40 comprises an outer metal envelope 48 which encloses a central drive shaft 50. Four finger-carrying shafts 52 are symmetrically arranged about the drive shaft and mounted at their opposite ends for rotation independently of one another and independently of the drive shaft. Each shaft 52 carries a row of rigid pickup fingers 54 flexibly mounted in a rubber-like base 56. Each row is positioned between the axes of the cutter discs at the midportion of the drum. Each finger 54 projects through an elongate slot 58 in the envelope which enables the finger to rotate with respect to the drum through an arc determined by the length of the slot.

As clearly shown in FIG. 1, the various fingers 54 in each row are of different lengths, in order to clear the discs as the drum rotates, with the fingers of greatest length being positioned midway between the two cutter discs and the remaining fingers on opposite sides of the most central fingers becoming progressively shorter as they approach the two discs.

An elevating conveyor 60 is positioned on the frame just to the rear of the drum 40 and is of conventional chain link construction well known in the root crop harvesting art. The drum is rotated at a speed and in a direction such that the fingers lift the beet tops carried rearwardly by the cutter discs and flip them rearwardly over the drum and onto the conveyor 60.

Referring to FIG. 2, the drum is rotated by a drive means which includes endless belts 61 and 62 connected to pulleys 63, 64 and 65 driven by the lateral drive shaft 20 from the gear box 18. The same pulleys 63, 64 and belt 61 drive the elevating conveyor 60 from a cross shaft 66.

Figure 5:
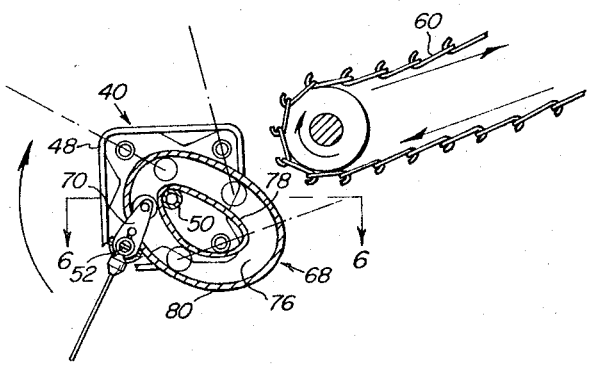
FIG. 5 is a view partly in section showing a portion of the drive means for the pickup mechanism taken approximately along the line 5—5 of FIG. 1.

It will be evident from FIGS. 3 and 5 that the lengths of the fingers 54 are so great that they would strike the elevating conveyor 60 as the drum rotates were it not for the fact that means are provided for counter-rotating each finger-carrying shaft 52 to collapse each row of fingers, as it approaches the conveyor 60. This means is shown in FIGS. 5 and 6 and includes a stationary cam 68 mounted at one end of the drum 40 eccentrically with respect to the drive shaft 50. Each finger-carrying shaft 52 is fixed at the cam end of the drum to a follower arm 70 which in turn is connected by a stub shaft 72 to a cam follower ball bearing 74. The cam follower travels in an oval cam path 76 defined by the continuous interior wall 78 and the peripheral wall 80 of the cam.

As viewed in FIG. 3, the drum and appurtenant fingers rotate in a clockwise direction so that beet tops are flung rearwardly over the drum onto the elevating conveyor without engaging the ground. The drum must, therefore, rotate at such a speed that the fingers throw the tops rearwardly rather than forwardly or vertically, in either of which latter cases the tops would eventually fall to the ground in front of the drum. It has been found, for example, that for a power take-off shaft speed of 540 r.p.m., which is standard for agricultural tractor power take-off units, the drum should rotate at a speed of approximately 87 r.p.m., or 6½ miles per hour, for the fingers to toss the beet tops rearwardly onto the conveyor. The drum speed can vary, however, between about 5½ and 7 miles per hour without affecting substantially the action of the pickup fingers. The ground speed of the unit can vary through a considerable range without necessitating a change in the drum speed.

Normally the tips of the fingers will clear the ground surface as the drum rotates but if they should contact a high spot when, for example, the frame travels over rough, uneven terrain, the fingers will not be damaged since they are flexibly mounted and the support arms 41 for the drum are spring mounted.

Figure 7:
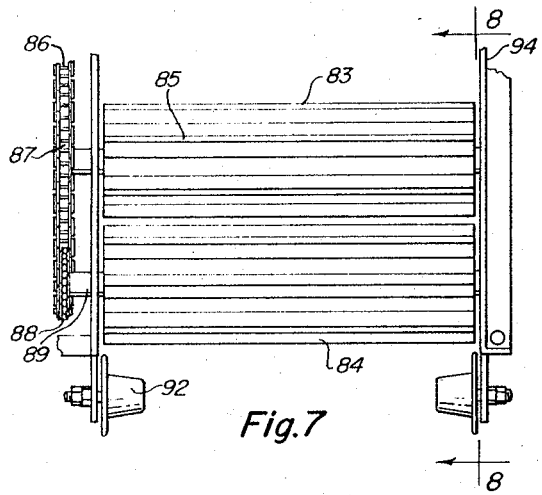
FIG. 7 is a front elevational view of the crushing rolls of the apparatus.
Figure 8:
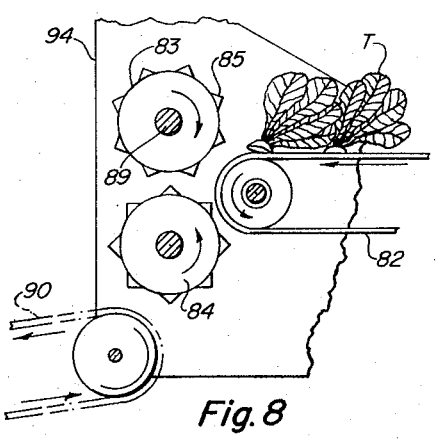
FIG. 8 is a side elevational view of the crushing rolls taken along the line 8—8 of FIG. 7.

From the lower end of the elevating conveyor 60 the beet tops are carried upwardly and rearwardly on the frame to a cross conveyor 82, which is of conventional chain link construction and which conveys the beet tops to one side of the frame. Means for crushing the beet tops into small enough pieces to be eaten by livestock is positioned at the discharge end of the cross conveyor. Referring to FIGS. 7 and 8, this means includes a pair of cylindrical crushing rolls including an upper roll 83 and a lower roll 84 between which the tops are fed by the cross conveyor. A plurality of crushing teeth 85 on the peripheral surface of each roll extend the full length thereof. The rolls are rotated in opposite directions indicated by the directional arrows in FIG. 8 so as to feed the tops T between the rolls to the outside of the frame. The rolls are driven by a common chain 86 and sprockets 87, 88 attached to the roll drive shafts 89. The lower roll 84 is driven at twice the speed of the upper roll so as to produce a tearing effect on the crowns of the beet tops passing between the rolls. It is important, however, that the crushing rolls are spaced apart slightly so that the teeth of the two rolls do not interengage. This slight spacing prevents the rolls from the tearing the foliage of the tops and at the same time breaks down the crowns into chunks of small enough size to be devoured by livestock. It has been found that a minimum clearance of approximately ⅛ inch between the tips of the teeth on the opposed rolls where such teeth converge will prevent any substantial damage to the foliage.

From the crushing rolls the beet tops may be discharged onto a conventional elevating conveyor (not shown) attached to the outside of the frame adjacent the outfeed side of the crushing rolls, from which the tops are discharged into a truck or wagon traveling alongside the present unit. Alternatively, the beets can be discharged onto a conveyor extension 90, a portion of which is depicted in FIG. 8, which deposits the tops onto a windrow extending parallel to the path of travel of the apparatus. A pair of stub shafts 92 (FIG. 7) are attached to opposite sides 94 of a housing between which the crushing rolls are mounted, for the purpose of mounting either an elevator or windrowing conveyor attachment.

A beet-cleaning unit is mounted on the rear end of the frame and includes a housing 100 which in FIG. 2 is shown schematically with one sidewall removed to reveal the interior thereof. Two sets 102 of flexible rubberlike flails 104, one set for each row of beets, are mounted on a drive shaft 105 between opposite sides of the housing 100. As viewed in FIG. 9, both sets of flails are rotated in a clockwise direction so that the flails when directed downwardly in engagement with the upper surfaces of the topped beets in the ground, travel in the same direction as the frame. The shaft 105 is driven by a series of belts 106, 107 and pulleys 108, 109 from the main lateral drive shaft 20 and its associated pulley 28.

Each set 102 of flails is identical to the other so that only one set need be described in detail. Each set includes four flail-carrying shafts 110 equally spaced about the drive shaft 105 and loosely mounted for rotation between a pair of square end plates 112 which are fixedly mounted to the drive shaft to turn therewith. Each shaft 110 carries four flails 104 which are of sufficient length so that when the shaft is rotated the outer end portions of the flails brush across the upper surfaces of the topped beets, sweeping them clear of any debris.

Figure 9:
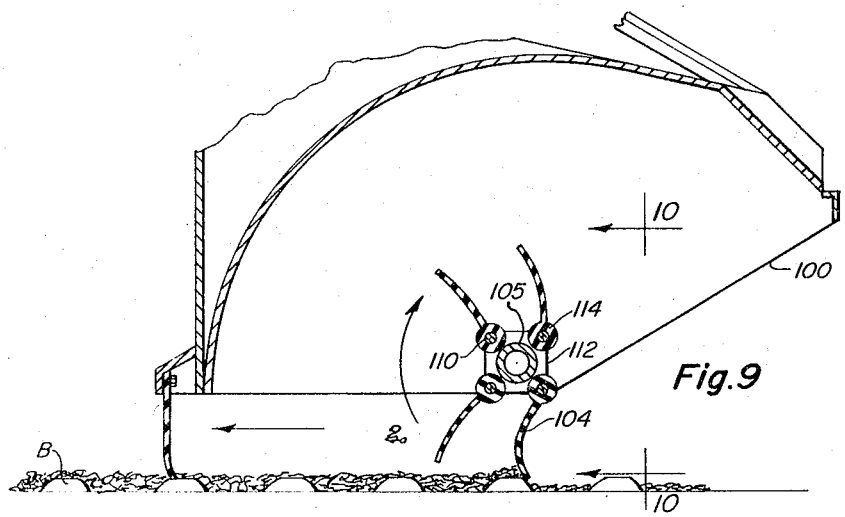
FIG. 9 is a vertical sectional view through the rear portion of the apparatus showing the flailing mechanism for cleaning the topped beets.
Figure 10:
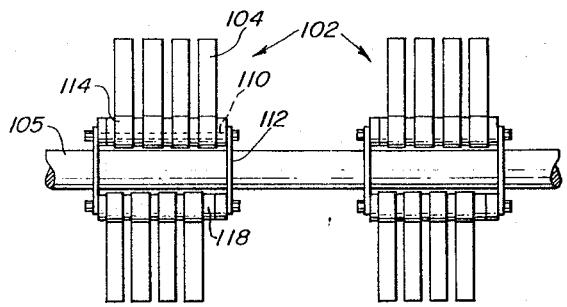
FIG. 10 is a fragmentary rear end view of the apparatus taken along the line 10—10 of FIG. 9, showing the two sets of flexible rubber-like flails for cleaning the topped beets.

From FIG. 9 it will be seen that each flail includes a continuous loop 114 at its inner end which slips over its shaft 110. The four flails on each shaft are spaced an equal distance apart by spacers 118. The flails on each shaft 110 are offset laterally with respect to the flails on the next adjacent shafts, in alignment with the spaces between the flails on such adjacent shafts so that each set of flails sweeps clear a swath having a width equal to the maximum distance across the flails in each set.

It will be apparent from the foregoing that as the tops are being severed simultaneously from two rows of beets and processed by the discs, fingers and crushing rolls, the two sets of cleaning flails sweep any remaining debris from the topped beets in the two rows so that such beets can be harvested in a perfect tare-free condition.

Having illustrated and described a preferred embodiment of the invention, it should be apparent to those skilled in the art that the invention permits of modification in arrangement and detail. It is intended to claim as the invention all such modifications as come within the true spirit and scope of the following claims.

1. An apparatus for topping beets and collecting the severed tops comprising:
   a mobile frame for travel in a foward direction along a row of beets to be topped,
   a cutter disc positioned on said frame for topping beets in said row said cutter disc being rotatable about a generally upright and forwardly inclined axis,
   cutter drive means on said frame for rotating said cutter disc,
   stationary deflector means extending across the upper surface of said cutter disc and positioned for guiding said tops rearwardly over and from the upper surface of said cutter disc,
   top pickup means rotatably carried by said frame rearwardly of said cutter disc and arranged in the path of severed tops thrown rearwardly by said disc, said pickup means being rotatable about a horizontal axis extending transversely of said frame rearwardly of said disc and being rotatable in a direction for lifting and transferring tops from said cutter disc rearwardly in a continuous flow above the ground surface,
   and conveyor means rearwardly adjacent said pickup means for receiving and conveying rearwardly on said frame tops from said pickup means.

2. An apparatus for topping beets and collecting the severed tops comprising:
   a mobile frame for travel simultaneously along at least two rows of beets to be topped,
   a laterally spaced-apart pair of cutter discs each for topping beets in a different one of the two rows,
   cutter drive means on said frame for rotating said cutter discs in opposite directions so that the rotative motion of said discs carries the beet tops severed thereby rearwardly of said frame between and over the upper surface of said discs,
   a deflector plate extending across the upper surface of each said cutter disc and positioned so that severed tops brought against said deflector plate by the rotation of the appurtenant cutter disc are deflected laterally and guided in a path between the axes of said cutter discs,
   an elongate top pickup means rotatably carried by said frame rearwardly of said cutter discs,
   said pickup means including pickup fingers projecting outwardly therefrom for conveying severed tops rearwardly from said cutter discs,
   drive means on said frame for rotating said fingers about a common axis extending laterally of said frame and in a direction so that the severed tops are lifted upwardly and conveyed rearwardly on said frame from said cutter discs without contacting the ground surface,
   and conveyor means rearwardly adjacent said pickup means onto which tops lifted by said pickup fingers are deposited for conveyance rearwardly on said frame.

3. An apparatus for topping beets and collecting the severed tops comprising:
   a mobile frame for travel simultaneously along at least two rows of beets to be topped,
   a laterally space-apart pair of cutter discs, each for topping beets in a different one of the two rows,
   cuter drive means on said frame for rotating said cutter discs in opposite directions such that the rotative motion of said discs carries severed beet tops rearwardly of said frame between said discs,
   deflector means extending across the upper surface of each said cutter disc and positioned for deflecting laterally between said pair of cutter discs the severed tops,
   a top pickup means rotatably carried by said frame rearwardly of said cutter discs,
   said pickup means including an elongate drum extending transversely of the direction of travel of said frame and spanning the distance between the axes of rotation of said cutter discs,
   a plurality of relatively rigid pickup fingers flexibly mounted within said drum for conveying severed tops rearwardly on said frame,
   conveyor means rearwardly adjacent said drum for receiving and conveying rearwardly on said frame tops deposited thereon by said pickup fingers,
   the outer tips of said fingers being positioned closely adjacent said cutter discs when projecting forwardly and closely adjacent said conveyor means when projecting rearwardly,
   and drive means for rotating said drum in a direction such that said fingers carry beet tops in a continuous stream rearwardly from said cutter discs over said drum and onto said conveyor means.

4. An apparatus according to claim 3 wherein
   said pickup means is so positioned with respect to said conveyor that the outer portions of at least some of said fingers, when said fingers are fully extended, describe an arc that, if projected, would intersect said conveyor means,
   and wherein said pickup means includes means for counter-rotating each row of said fingers to a collapsed position in a direction opposite to their direction of travel as each said row approaches said conveyor means, said rows being rotated to such an extent that said fingers avoid engagement with said conveyor means upon passing by the same.

5. An apparatus according to claim 3 including a pair of support arms each being pivoted at one end to said frame and extending generally horizontally from said end, said drum being rotatably mounted between the opposite ends of said support arms, and spring means supporting the opposite ends of said arms on said frame so that said drum is self-adjusting vertically when said frame travels over rough, uneven ground.

6. An apparatus for topping beets and collecting the severed tops comprising:

a mobile frame for travel along a row of beets to be topped, a cutter disc positioned on said frame for topping beets in said row, cutter drive means on said frame for rotating said cutter disc, deflector means extending across the upper surface of said cutter disc and positioned for deflecting laterally tops cut by said cutter disc and guiding said tops rearwardly on the upper surface of said cutter disc, top pickup means rotatably carried by said frame rearwardly of said cutter disc, including a plurality of pickup fingers radiating outwardly from said pickup means for lifting and transferring severed tops from said cutter disc rearwardly above the ground surface, conveyor means positioned rearwardly adjacent said pickup fingers for receiving severed tops from said fingers and conveying said tops rearwardly on said frame, and top-crushing means positioned at the discharge end of said conveyor means for crushing said tops into pieces of relatively uniform predetermined maximum size.

7. An apparatus for topping beets and collecting the severed tops comprising:

a mobile frame for travel along a row of beets to be topped, a cutter disc positioned on said frame for topping beets in said row, cutter drive means on said frame for rotating said cutter disc, deflector means extending across the upper surface of said cutter disc and positioned for deflecting laterally tops cut by said cutter disc and guiding said tops rearwardly on the upper surface of said cutter disc, top pickup means rotatably carried by said frame rearwardly of said cutter disc, including a plurality of pickup fingers radiating outwardly from said pickup means for lifting and transferring severed tops from said cutter disc rearwardly above the ground surface, conveyor means positioned rearwardly adjacent said pickup fingers for receiving severed tops from said fingers and conveying said tops rearwardly on said frame, crushing means positioned at the discharge end of said conveyor means including a pair of toothed crushing rolls, drive means for rotating said crushing rolls in opposite directions so that severed tops from said conveyor means are conveyed between said rolls, said rolls being spaced apart a sufficient distance as not to interengage one another and so as to crush the crowns of said beet tops into pieces of a predetermined maximum size without shredding the foliage of such crowns.

8. Apparatus according to claim 7 wherein said conveying means conveys beet tops to one side of said frame and wherein said crushing rolls are positioned at said one side so that beet tops after passing between said rolls can be deposited in windrows along-side said frame.

9. Apparatus for topping beets and collecting the severed tops comprising:

a mobile frame for travel along a row of beets to be topped, a cutter disc positioned on said frame for topping beets in said row, cutter drive means on said frame for rotating said cutter disc, deflector means extending across the upper surface of said cutter disc and positioned for deflecting laterally tops severed by said cutter disc and guiding said tops rearwardly over the upper surface of said cutter disc, top pickup means rotatably carried by said frame rearwardly of said cutter disc, including pickup fingers radiating from said means for lifting and transferring severed tops from said cutter disc rearwardly on said frame above the ground surface, conveyor means rearwardly adjacent said pickup fingers for receiving severed tops from said fingers and conveying said tops rearwardly, and rotatable flailing means on a rear portion of said frame, including a plurality of flexible rubber-like flails positioned for engaging the topped beets in said row and cleaning debris from said beets as the frame passes thereover, and drive means for rotating said flails in a direction which, when engaging said beets, will correspond to the direction of travel of said frame.

10. An apparatus for topping beets and collecting the severed tops comprising:

a mobile frame for travel simultaneously along at least two rows of beets to be topped, a laterally spaced-apart pair of cutter discs each for topping beets in a different one of any two rows, cutter drive means on said frame for rotating said cutter discs in opposite directions so that the rotative motion of said discs carries the beet tops severed thereby rearwardly of said frame between said discs and over the upper surface of said discs, a deflector plate means extending across the upper surface of each said cutter disc and positioned so that severed tops brought against said deflector plate means by the rotation of the cutter disc are deflected laterally and guided in a path between the axes of said cutter discs, an elongate top pickup means rotatably carried by said frame rearwardly of said cutter discs including a plurality of pickup fingers projecting outwardly from said pickup means for conveying severed tops rearwardly on said frame from said cutter discs, drive means on said frame for rotating said fingers about a common axis extending laterally of said frame and in a direction and at a speed such that the severed tops flung rearwardly from said cutter discs above the axis of rotation of said pickup means without contacting the ground surface, conveyor means rearwardly adjacent said pickup fingers for receiving severed tops from said fingers and conveying said tops rearwardly on said frame, said conveyor means having a discharge end at one side of said frame, crushing means, including a pair of crushing rolls, positioned at said one side of said frame adjacent said discharge end of said conveyor, flailing means on a portion of said frame including a plurality of flexible rubber-like flails positioned for engaging the topped beets in said two rows, and drive means for rotating said flails in a direction which, when engaging said beets, corresponds to the direction of travel of said frame so as to remove debris from said beets and thereby condition said beets for harvesting.

11. Apparatus according to claim 7 wherein one of said crushing rolls is rotated at a greater speed than the other so that the rolls exert a tearing action on the crowns of said beet tops.

12. An apparatus for topping beets and collecting the severed tops comprising:
   a mobile frame having a front end and a rear end and movable in a forward direction along a row of beets to be topped,
   a cuter disc positioned on said frame for topping beets in said row, said disc being rotatable about a generally upright and forwardly inclined axis and having a leading edge portion and a trailing edge portion,
   cutter drive means on said frame for rotating said cutter disc,
   a generally upright deflector plate extending rearwardly across the upper surface of said cutter disc in a position so that tops severed by the leading edge portion of said cutter disc are conveyed by said disc rearwardly over the upper surface thereof and deflected rearwardly by said plate from a trailing edge portion of said disc,
   top pickup means carried by said frame, including a plurality of pickup fingers mounted for rotation about a horizontal axis extending transversely of said frame rearwardly of said cutter disc,
   said pickup fingers being arranged about said horizontal axis and extending toward said disc in one position of rotation thereof, and having outer-ends terminating rearwardly adjacent a trailing edge portion of said disc when said fingers are in said one position,
   said pickup fingers being rotated in a direction so that the outer ends thereof sweep upwardly past the trailing edge portion of said disc whereby tops thrown rearwardly by said disc are flung further rearwardly by said fingers,
   and conveyor means rearwardly adjacent said pickup means for receiving and conveying further rearwardly on said frame tops flung rearwardly by said pickup fingers,
   the speed of rotation of said disc and fingers being so related to the forward movement of said frame that tops severed by said cutter disc are conveyed in a continuous rearward flowing stream to said conveyor means without engaging the ground surface during such travel.

13. Apparatus according to claim 12 wherein said cutter disc is tilted slightly forwardly so that the leading edge portion thereof is positioned slightly below the trailing edge portion thereof,
   the axis of rotation of said pickup fingers is spaced rearwardly of and slightly above the trailing edge portion of said cutter disc,
   said conveyor means extends at an inclination upwardly in a direction rearwardly of said frame from a leading end portion of said conveyor means,
   and the leading end portion of said conveyor means is positioned slightly above the axis of rotation of said pickup fingers whereby beet tops severed by said cutter disc are carried continuously and progressively upwardly and rearwardly on said frame by said cutter disc, pickup fingers and conveyor means.

References Cited by the Examiner
UNITED STATES PATENTS
| | | | |
|---|---|---|---|
| 1,568,810 | 1/1926 | Djuberg | 56—121.45 |
| 2,637,964 | 5/1953 | Orendorff | 56—121.44 |

ABRAHAM G. STONE, *Primary Examiner.*

ANTONIO F. GUIDA, *Examiner.*